US010955250B2

(12) United States Patent
Leone et al.

(10) Patent No.: US 10,955,250 B2
(45) Date of Patent: Mar. 23, 2021

(54) VEHICLE MAINTENANCE OPERATION

(71) Applicant: Ford Global Technologies, LLC, Dearborn, MI (US)

(72) Inventors: Thomas G. Leone, Ypsilanti, MI (US); Aed M. Dudar, Canton, MI (US); Kenneth J. Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 15/818,852

(22) Filed: Nov. 21, 2017

(65) Prior Publication Data

US 2019/0154453 A1 May 23, 2019

(51) Int. Cl.
| | |
|---|---|
| *G01C 21/34* | (2006.01) |
| *B60W 30/188* | (2012.01) |
| *G05D 1/00* | (2006.01) |
| *G07C 5/08* | (2006.01) |
| *G07C 5/00* | (2006.01) |

(52) U.S. Cl.
CPC ....... *G01C 21/3415* (2013.01); *B60W 30/188* (2013.01); *G01C 21/343* (2013.01); *G05D 1/0088* (2013.01); *G07C 5/006* (2013.01); *G07C 5/0808* (2013.01); *G07C 5/0816* (2013.01)

(58) Field of Classification Search
CPC .......................... G01C 21/3415; B60W 30/188
See application file for complete search history.

(56) References Cited

U.S. PATENT DOCUMENTS

| 8,874,305 B2 * | 10/2014 | Dolgov ................. B60W 50/14 |
| | | 701/31.9 |
| 9,317,033 B2 | 4/2016 | Ibanez-Guzman et al. |
| 9,355,549 B2 | 5/2016 | McClintic et al. |
| 9,709,984 B2 | 7/2017 | Cudak et al. |
| 2010/0036599 A1 | 2/2010 | Froeberg et al. |
| 2017/0123421 A1 | 5/2017 | Kentley et al. |

(Continued)

FOREIGN PATENT DOCUMENTS

| GB | 2549590 A | 10/2017 |
| JP | 2016085092 A * | 5/2016 |

OTHER PUBLICATIONS

NPL English translation of Hiroki (JP-2016085092-A) (Year: 2016).*

(Continued)

*Primary Examiner* — Bao Long T Nguyen
*Assistant Examiner* — Bakari Underwood
(74) *Attorney, Agent, or Firm* — Brandon Hicks; Bejin Bieneman PLC

(57) ABSTRACT

A system includes a processor and a memory. The memory stores instructions executable by the processor to identify a vehicle part to replace based on received vehicle data including a diagnostic status, a location, and a first route. The memory stores instructions executable by the processor to determine a vehicle operating pattern based on the identified vehicle part and to generate a second route including a second destination based on the vehicle part, the vehicle operating pattern, the location, and a first destination and an expected time of arrival of the first route. The memory stores instructions executable by the processor to navigate the vehicle based on the determined second route and the vehicle operating pattern.

14 Claims, 2 Drawing Sheets

(56) References Cited

U.S. PATENT DOCUMENTS

2017/0139412 A1    5/2017  Keohane et al.
2017/0278312 A1*  9/2017  Minster ................ G05D 1/0297
2018/0046182 A1*  2/2018  Joyce .................... G07C 5/008
2018/0164814 A1*  6/2018  Poeppel ............. G06Q 10/0631

OTHER PUBLICATIONS

Combined Search and Examination Report from the United Kingdom Intellectual Property Office (UKIPO) dated May 13, 2019 regarding Application No. GB1818655.1 (7 pages).

\* cited by examiner

VEHICLE MAINTENANCE OPERATION

BACKGROUND

In an autonomous vehicle, typically a computer navigates the vehicle based on, e.g., a request from a vehicle owner, customer of a fleet of vehicles, etc. However, a vehicle component such as an actuator, sensor, controller, etc., may fail to operate. Further, a part or component may fail, impairing vehicle operation, wherein the vehicle is unable to continue operating, or continued operation is impaired, because the vehicle lacks technology to address the failed or impaired component. Due to current technological constraints, vehicle repair typically includes a sequential process of failure diagnosis, acquisition of parts and supplies, and then, at the end of the sequence, repair of the vehicle. It is a problem that carrying out this sequential process can result in long delays, especially given the possibility that a vehicle repair might require availability and ability to access a given part from among a large number of replacement parts for a wide variety of vehicle models. It is a problem that vehicles lack the ability to effectively or efficiently identify and address such failures.

DETAILED DESCRIPTION

Introduction

Figure 1:
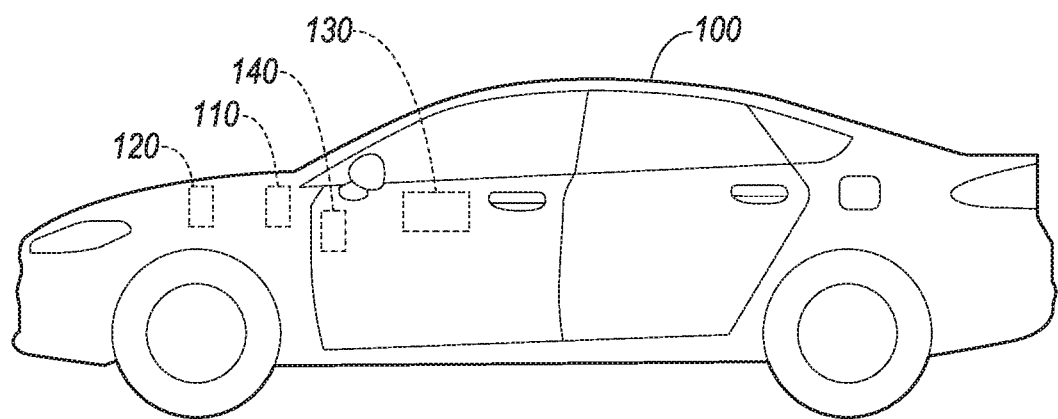
FIG. 1 is a diagram of an exemplary vehicle system.

Disclosed herein is a system including a processor and a memory. The memory stores instructions executable by the processor to identify a vehicle part to replace based on received vehicle data including a diagnostic status, a location, and a first route, determine a vehicle operating pattern based on the identified vehicle part. The memory stores instructions executable by the processor to generate a second route including a second destination based on the vehicle part, the vehicle operating pattern, the location, and a first destination and an expected time of arrival of the first route, and to navigate the vehicle based on the determined second route and the vehicle operating pattern.

The instructions may include further instructions to, upon receiving the vehicle part at the second destination, identify a service location based at least in part on the vehicle part, and to navigate the vehicle to the identified service location.

The diagnostic status may further include an estimated remaining useful life for the vehicle part and a diagnostic trouble code, and the instructions may include further instructions to identify the vehicle part to replace upon determining based on at least one of the estimated remaining useful life for the vehicle part is less than a specified threshold and a diagnostics trouble code associated with the vehicle part is recorded.

The instructions may include further instructions to identify the vehicle part to replace upon determining based on the first route that a planned travel distance exceeds a remaining useful life for the vehicle part.

The instructions may include further instructions to navigate the vehicle based on the determined vehicle operating pattern by limiting at least one of a vehicle speed, a vehicle acceleration, a vehicle deceleration, and a vehicle yaw rate to a respective threshold.

The instructions may include further instructions to determine the second route based at least in part on map data including a road curvature and a road speed limit, the vehicle operating pattern including at least one of a vehicle maximum speed, a vehicle maximum acceleration, and a vehicle maximum yaw rate.

The instructions may include further instructions to generate the second route based on a current time and expected vehicle deployment time for vehicle occupant transportation.

The instructions may include further instructions to instruct a second vehicle to transport the vehicle part to a service center at the second destination, upon determining that dimensions of the vehicle part to replace exceeds a predetermined threshold associated with the vehicle, and navigate the vehicle to the service center.

Further disclosed herein is a method including identifying a vehicle part to replace based on received vehicle data including a diagnostic status, a location, and a first route, determining a vehicle operating pattern based on the identified vehicle part, generating a second route including a second destination based on the vehicle part, the vehicle operating pattern, the location, and a first destination and an expected time of arrival of the first route, and navigating the vehicle based on the determined second route and the vehicle operating pattern.

The method may further include, upon receiving the vehicle part at the second destination, identifying a service location based at least in part on the vehicle part, and navigating the vehicle to the identified service location.

The method may further include identifying the vehicle part to replace upon determining based on at least one of an estimated remaining useful life for the vehicle part is less than a specified threshold and a diagnostics trouble code associated with the vehicle part is recorded, wherein the diagnostic status further includes the estimated remaining useful life for the vehicle part and the diagnostic trouble code.

The method may further include identifying the vehicle part to replace upon determining based on the first route that a planned travel distance exceeds a remaining useful life for the vehicle part.

The method may further include navigating the vehicle based on the determined vehicle operating pattern by limiting at least one of a vehicle speed, a vehicle acceleration, a vehicle deceleration, and a vehicle yaw rate to a respective threshold.

The method may further include determining the second route based at least in part on map data including a road curvature and a road speed limit, the vehicle operating pattern including at least one of a vehicle maximum speed, a vehicle maximum acceleration, and a vehicle maximum yaw rate.

The method may further include generating the second route based on a current time and expected vehicle deployment time for vehicle occupant transportation.

The method may further include instructing a second vehicle to transport the vehicle part to a service center at the second destination, upon determining that dimensions of the vehicle part to replace exceeds a predetermined threshold associated with the vehicle, and navigating the vehicle to the service center.

Further disclosed is a computing device programmed to execute the any of the above method steps. Yet further disclosed is a vehicle comprising the computing device.

Yet further disclosed is a computer program product, comprising a computer readable medium storing instructions executable by a computer processor, to execute any of the above method steps.

System Elements

FIG. 1 is a block diagram of a vehicle 100. The vehicle 100 may be powered in variety of known ways, e.g., with an electric motor and/or internal combustion engine. The vehicle 100 may include a computer 110, actuator(s) 120, sensor(s) 130, and a human machine interface (HMI 140), each of which are discussed in more detail below.

The computer 110 includes a processor and a memory. The memory includes one or more forms of computer-readable media, and stores instructions executable by the computer 110 for performing various operations, including as disclosed herein.

The computer 110 may include programming to operate one or more of vehicle brakes, propulsion (i.e., means for overcoming resistance and propelling the vehicle 100, such as one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may operate the vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking; in a non-autonomous mode a human operator controls each of vehicle 100 propulsion, braking, and steering.

The computer 110 is generally arranged for communications on a vehicle communication network, e.g., including a communication bus such as a controller area network (CAN) or the like. The computer 110 may include or be communicatively coupled to, e.g., via a vehicle communications bus as described further below, more than one processor, e.g., controllers or the like included in the vehicle for monitoring and/or controlling various subsystems such as a powertrain, brake, steering, etc.

Via the vehicle network, the computer 110 may transmit messages to various devices in the vehicle 100 and/or receive messages from the various devices, e.g., controllers, actuators, sensors, etc., including sensors 130. Alternatively or additionally, in cases where the computer 110 actually comprises multiple devices, the vehicle communication network may be used for communications between devices represented as the computer 110 in this disclosure. Further, as mentioned below, various controllers and/or sensors 130 may provide data to the computer 110 via the vehicle communication network.

In addition, the computer 110 may be configured for communicating through a wireless communication interface with a remote computer via a wireless communication network. The communication network may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular, Bluetooth, IEEE 802.11, dedicated short range communications (DSC), and/or wide area networks (WAN), including the Internet, providing data communication services.

Sensors 130 may include a variety of devices to provide data via the vehicle communications bus. For example, the sensors 130 may include one or more cameras, radars, and/or Light Detection and Ranging (LIDAR) sensors disposed in the vehicle 100 providing data encompassing at least some of the vehicle interior and/or exterior.

The actuators 120 can actuate various vehicle subsystems in accordance with appropriate control signals and typically include circuits, chips, and/or other electronic components. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a control unit located in the vehicle 100, e.g., an electronic control unit (ECU) such as a brake controller, etc. The vehicle 100 may include various components or sub-systems, each including one or more sensors 130, actuators 120, controller, etc. For example, the vehicle 100 may include a brake component including brake sensors 130, brake actuators 120, and/or other electronic, mechanical, etc. elements that stop the vehicle 100 based on commands received from a controller such as the computer 110. As another example, the vehicle 100 may include a powertrain component or sub-system that may include one or more actuators 120, sensors 130, etc., in addition to an engine, electric motor, and/or a transmission.

The HMI 140 may be configured to receive user input, e.g., during operation of the vehicle 100. As one example, an HMI 140 may include touchscreens, buttons, knobs, keypads, microphone, and so on for receiving information from a user. Moreover, an HMI 140 may include various interfaces such as a touchscreen display, a smart phone, etc., for receiving information from a user and/or output information to the user.

A vehicle 100 component, e.g., an actuator 120, a sensor 130, an electronic controller included in a component, etc., may have a fault. A fault is a condition in which a component fails to operate or operates outside of one or more predefined parameters (e.g., a predefined parameter could be a physical quantity such as temperature, torque, revolutions per minute, pressure, etc.). The vehicle 100 computer 110 may be programmed to determine whether a vehicle 100 component, e.g., a propulsion, braking, steering, etc., is in a fault condition based on data received from, e.g., various vehicle 100 sensors 130, actuators 120, controllers, etc. For example, a fault can be determined by a diagnostic operation such as an onboard diagnostic operation (OBD), i.e., the computer 110 may be programmed to monitor a vehicle 100 component, possibly while actuating the component in a specified way for the diagnostic operation, and determine whether a fault condition has occurred, e.g., whether a physical quantity is outside a predefined range.

In addition to detecting fault condition(s) in the vehicle 100, a diagnostic operation may include estimating a remaining useful life of a vehicle 100 part, e.g., a brake pad, tire, windshield wiper blade, etc., and/or a vehicle 100 fluid such as engine oil, brake fluid, etc. The remaining useful life may be specified in units of time, e.g., 1 month, distance travelled, e.g., 500 kilometer (km), and/or a combination thereof, e.g., the earlier of 1 month and 50 km. The computer 110 may be programmed to estimate the remaining useful life of a vehicle 100 part based on data received from a vehicle 100 sensor 130, e.g., an odometer sensor 130, a timer providing a current time and date, and stored data such as an expected useful life of one or more vehicle 100 parts and records of last replacement of each of the vehicle 100 parts. For example, the computer 110 memory could store a table or tables correlating various metrics, e.g., time of last oil change, miles since last brake pad change, etc., with respective values (e.g., time and/or distance) for remaining useful life of a respective part, e.g., brake pads have 500 miles of remaining useful life.

Records or history of the last replacement of the vehicle 100 parts may include an associated odometer reading and/or a date of replacement. Additionally or alternatively, the computer 110 may be programmed to estimate the remaining useful life of the vehicle 100 parts based at least in part on data received from a vehicle 100 sensor 130. For example, the computer 110 may be programmed to estimate the remaining useful life of the vehicle 100 engine oil based on historical data including engine temperature, engine speed, duration and intensity of brake pedal actuation, duration of windshield wiper usage, etc., and/or distance travelled since the last oil change of the vehicle 100.

In one example, the computer 110 may be programmed to estimate the remaining useful life of the vehicle 100 engine oil by subtracting the distance travelled since the last oil change from a predetermined useful life of the engine oil. The useful life of the engine oil may be predetermined by an oil manufacturer, a vehicle 100 manufacturer, etc. For example, the computer 110 may estimate a remaining useful life of 1000 km when the predetermined useful life of the engine oil is 6000 km and the vehicle 100 has travelled 5000 km since the last oil change. Additionally or alternatively, the computer 110 may be programmed to estimate the remaining useful life of the engine oil by subtracting an age parameter (e.g., determined based on the temperature, speed, etc.) from the predetermined useful life of the engine oil. The age parameter may be determined in units of kilometer (km) based on, e.g., a mathematical operation including integral operation on the engine temperature and/or vehicle 100 speed since the last oil change. In other words, operating the engine in higher temperature and/or operating the vehicle 100 in higher speeds may proportionally increase the age parameter (i.e., decrease the remaining useful life).

A remaining useful life of a vehicle 100 component less than a predetermined threshold may indicate an increased likelihood of a fault condition in the vehicle 100 component, e.g., a flat tire, partially operational or non-operational brake pad or windshield wiper, etc. Further, a remaining useful life less than a predetermined threshold can be a "predicted" fault condition. In the present disclosure, a "diagnostic status" specifies whether the diagnostic operation determines that the fault condition is detected, e.g., an "active" and an "inactive" fault condition. The diagnostic operation may further include recording the diagnostic status, e.g., in a computer 110 memory. Each diagnostic operation may be identified by a diagnostic trouble code (DTC) which is typically a unique numeric code specifying a particular fault condition that the computer 110 may receive via a vehicle 100 network such as a Controller Area Network (CAN communications bus. It is to be understood that DTCs are discussed herein by way of example and not limitation; other fault identifiers or descriptors could be used in the context of the present disclosure. Further, the diagnostic status may include data including a remaining useful life of one or more vehicle 100 components.

A fault condition in the vehicle 100, e.g., of a component or part needed to safely operate the vehicle 100, may impair and/or prevent vehicle 100 operation, e.g., preventing it from navigating to a destination. Advantageously, the computer 110 can be programmed to identify a vehicle 100 part to replace based on received vehicle 100 data including a diagnostic status, a location, and a first route (sometimes also called the primary route) that includes a first destination, i.e., an end location of the first route.

The computer 110 can be programmed to identify the vehicle 100 part based on, e.g., a severity, of the detected fault condition. In one example, the computer 110 may be programmed to associate a severity to each detected fault condition based on a level of impairment that fault condition may cause, e.g., the computer 110 may store a table or the like in a memory that associates various fault conditions with respective severity levels. As one example, a severity may be specified as one of a "low", "medium", or "high" severity. For example, a brake sub-system fault condition may be associated with the "high" severity, whereas a multimedia sub-system fault condition may be associated with the "low" severity. The computer 110 may be programmed to identify the part to replace upon determining that the severity of the fault condition is equal to or exceeds the "medium" severity.

Additionally or alternatively, the computer 110 may be programmed to identify the vehicle 100 part to replace based on a combination of the diagnostic status and the location of the vehicle 100, as well as possibly also a severity. In one example, the computer 110 may be programmed to identify the vehicle 100 part to replace upon determining that the severity of the fault condition is equal to or exceeds the medium level and the distance from the current location to a nearest second destination, e.g., the part supply location, the service center (or service location), etc., is less than a predetermined distance threshold, e.g., 15 km. Additionally or alternatively, the predetermined distance threshold may be specified based on the severity level. For example, the predetermined distance threshold for a "medium" or "low" severity fault condition may be 15 km, whereas for a "high" severity fault condition may be 30 km. In other words, the computer 110 may be programmed to navigate the vehicle farther away from the current location when the severity of the fault condition increases.

Additionally or alternatively, the computer 110 may be programmed to identify the part to replace further based on the first route. For example, the computer 110 may be programmed to identify the vehicle 100 part to replace, upon determining that an additional distance to travel away from the current route is less than the predetermined travel distance. In other words, the computer 110 may be programed to identify the vehicle 100 part to replace if a nearest second destination from a point on the first route is less than the predetermined distance threshold.

Additionally or alternatively, the computer 110 may be programmed to determine the second destination based on information including upcoming travel requests and/or shipping requests. For example, the computer 110 may be programmed to select a second destination based on historical data of travel and/or shipping requests. In on example, the computer 110 may be programmed to receive information about users of a transportation service and/or shipping service and select a second destination with a higher concentration of the users compared to other possible second destinations, e.g., other possible parts stores.

Additionally or alternatively, the computer 110 may be programmed to identify the part using an optimization technique including a mathematical operation specifying a confidence level based on the received vehicle 100 data. The confidence level, in the present context, is a quantifier for a need to replace a part. The computer 110 may be programmed to determine the confidence level using a mathematical operation based on the severity of the predicted and/or determined (i.e., active) fault condition(s), the vehicle 100 location, the first destination, traffic data, opening hours of possible second locations, e.g., the part supply location, service center, etc., and/or expected arrival time at the first destination. In one example, the computer 110 may be programmed to identify the part to replace upon determining the specified confidence level exceeds a confidence threshold, e.g., 80% in a confidence range of 0 (zero) to 100%.

In one example, the computer 110 may be programmed to determine the confidence level based on information stored in a computer 110 memory, e.g., Table 1, and the detected fault condition. Table 1 shows an example list of fault conditions of the vehicle 100 and a confidence level associated with each listed fault condition. Additionally or alternatively, the computer 110 may be programmed to receive an updated list of confidence level versus fault conditions from a remote computer. For example, a vehicle 100 manufacturer may store an updated table such as Table 1 based on updated warranty data of vehicles 100 of same type, model, etc., in the remote computer. Additionally or alternatively, the computer 110 may be programmed to determine the confidence level based on the detected fault condition and a table including fault condition categories and associated confidence levels. For example, the table may include categories such as sensors, actuators, etc. The computer 110 may be programmed to, at first, determine the category of a fault condition, e.g., the category sensors for a throttle sensor fault condition, and then determine the confidence level based on the determined category and the table.

TABLE 1

| Fault Condition | Confidence Level |
|---|---|
| Throttle position sensor - open circuit fault | 5% |
| Throttle position sensor - short circuit fault | 5% |
| Throttle position sensor - any other faults | 99% |
| Coolant temperature sensor - open circuit fault | 5% |
| Coolant temperature sensor - short circuit fault | 5% |
| Coolant temperature sensor - any other faults | 95% |

The computer 110 can be further programmed to determine a vehicle operating pattern based on an identified vehicle part (as discussed below concerning Table 2) and to generate a second (or secondary) route including a second destination (e.g., an end location of the second route) based on a location to address a predicted or determined fault in the vehicle part, the vehicle operating pattern, the location, and a first destination and expected time of arrival of the first route. The computer 110 can be further programmed to navigate the vehicle based on the determined second route and the vehicle operating pattern.

In the present disclosure, a "location" is a point or a set of points on the surface of the earth, e.g., as defined by coordinates used with respect to the Global Positioning System (i.e., often referred to as "GPS coordinates") or the like.

In the present disclosure, an "operating pattern" of a vehicle 100 is a set of a plurality of data that specifies vehicle 100 physical parameters including speed, acceleration, yaw rate, elevation, slope of a vehicle body, vibration, etc., and/or instructions sent by the vehicle 100 computer 110 to vehicle 100 components including planning a route to achieve a specific speed, acceleration, etc. The computer 110 may be programmed to actuate vehicle 100 actuator(s) 120 based on the operating pattern, e.g., to traverse the planned route by actuating the vehicle 100 actuators 120.

In one example, the computer 110 may be programmed to generate the second route based on the expected time of arrival, e.g., by determining whether navigating to a nearest second destination, e.g., a part supply location, will make the expected time of arrival later. In other words, the computer 110 may be programmed to generate the second route to navigate the vehicle 100, at first, to the second destination and then to the first destination upon estimating that the time of arrival at the first destination will be prior to the expected time of arrival; otherwise, the computer 110 may be programmed to identify a second destination nearest to the first destination and generate the second route to navigate the vehicle 100 to the first destination, at first, and then to the second destination.

Additionally or alternatively, the computer 110 may be programmed to identify the second destination and generate the second route based on the severity of the determined or predicted fault condition. For example, the compute 110 may be programmed to generate the second route including navigating the vehicle 100 to the second destination, at first, and then to the first destination, upon determining that the severity of the determined fault condition has a "high" severity; otherwise generate the second route including navigating the vehicle 100 to the first destination, at first, and then to the second destination. Additionally or alternatively, the computer 110 may be programmed to generate the second route based on the determined operating pattern, as discussed below concerning examples shown in Table 2.

TABLE 2

| Fault Number | Vehicle part | Operating Pattern |
|---|---|---|
| 1 | Brake pad | Find route maximizing travel on a freeway or highway (to reduce brake pad usage) |
| 2 | Tire | Find a smoothest possible route |
| 3 | Electric battery | Suppress start/stop subsystem |
| 4 | Air filter | Avoid dirt road(s) |

Table 2 shows an example list of fault conditions in the vehicle 100, i.e., based on detected data from a vehicle component or part, including a sensor 130, and/or predicted based on a remaining useful life of a vehicle 100 component being less than a threshold. For example, the computer 110 may be programmed to identify a vehicle 100 part to replace upon detecting a fault condition associated with the vehicle 100 part, i.e., a diagnostic status associated with the fault condition in in the "active" state. Additionally or alternatively, the computer 110 may be programmed to identify a vehicle 100 part to replace upon determining that the estimated remaining useful life for the vehicle part is less than a specified threshold.

Table 2 further shows various example operating patterns each associated with a detected or predicted fault condition. With reference to a first example shown in Table 2, the computer 110 may be programmed to determine that the vehicle 100 brake pad has a predicted fault, i.e., based on determining that the remaining useful life of the brake pad is less than a predetermined threshold, e.g., 100 km, 1 month, or a combination thereof, a current location of the vehicle 100, etc. The computer 110 may be programmed to determine a second destination, e.g., a vehicle parts supplier location, and a second route to the second destination such that the route is primarily (i.e., as much as possible) via freeways and/or highways. Thus, advantageously, the parts that should be replaced, i.e., the brake pad, is less used until the vehicle 100 reaches the second destination, compared to, e.g., a route that would go through an urban area with multiple traffic lights, stop and go traffic, etc., which causes more brake actuation.

With reference to a second example shown in Table 2, the computer 110 may be programmed to detect a vehicle 100 tire to replace, e.g., based on data received from tire pressure sensor 130, and/or determining that a remaining useful life of the tire is less than a predetermined threshold, e.g., 100 km. The computer 110 may be programed to determine the second route to the second destination, e.g., a tire shop, such that a surface of road(s) included in the second route is/are less bumpy compared to other possible routes to the second destination. The computer 110 may be programmed to determine the second route based on map data including road surface quality data. Thus, advantageously, a likelihood of a flat tire until the vehicle 100 reaches the second destination may be minimized compared to other possible routes to the second destination.

With reference to a third example shown in Table 2, the computer 110 may be programmed to identify a vehicle 100 battery to replace, e.g., based on data received from a battery sensor 130 which indicates that the battery remaining useful life is less than a predetermined threshold, e.g., 1 month. The computer 110 may be programmed to deactivate a vehicle 100 start/stop subsystem upon identifying the vehicle 100 battery for replacement. A start/stop subsystem of the vehicle 100, as it is generally known, refers to stopping a vehicle 100 engine upon stopping, e.g., at a traffic light, and starting the engine, e.g., upon changing the traffic light from red to green. For example, the computer 110 may be programmed to perform a start/stop operation in the vehicle 100 based on data received from the vehicle 100 sensors 130. A start of the vehicle 100 engine typically draws a significant amount of electric current, e.g., 30 Ampere, for a short time period, e.g., 0.3 second, to start the engine. A battery for which a fault condition is indicated may fail to provide such electrical energy to start the vehicle 100 engine. Thus, advantageously, the computer 110 may be programmed to suppress the start/stop subsystem upon determining or predicting the vehicle 100 battery fault condition.

With reference to a fourth example, shown in Table 2, the computer 110 may be programmed to identify an air filter of the vehicle 100 engine to replace, e.g., based on data received from the vehicle 100 sensor(s) 130. Upon identifying the air filter for replacement, the computer 110 may be programmed to, if possible, avoid dirt roads in the second route. In other words, the computer 110 may be programmed to determine the second route such that an amount of dust entering the air filter is minimized, e.g., selecting a route that compared to other possible routes has a shorter distance travelled on a dirt road.

The computer 110 may be programmed to navigate the vehicle based on the determined vehicle operating pattern by limiting at least one of a vehicle speed, a vehicle acceleration, a vehicle deceleration, and a vehicle yaw rate to a respective threshold. The computer 110 may be programmed to determine the second route based at least in part on map data including a road curvature and a road speed limit, the vehicle operating pattern including at least one of a vehicle maximum speed, a vehicle maximum acceleration, and a vehicle maximum yaw rate.

As discussed above, the computer 110 may identify a vehicle 100 part for replacement upon determining that the remaining useful life of the part is less than a predetermined threshold, e.g., 100 km. In one example, the computer 110 may be programmed to navigate the vehicle 100 to a first destination which is 500 km away from the current location of the vehicle 100. In such example, the computer 110 may be programmed to identify the vehicle part to replace upon determining based on the first route that a planned travel distance, e.g., 500 km, exceeds a remaining useful life for the vehicle 100 part.

After arrival of the vehicle 100 at the second destination, in one example, the identified part may be delivered to the vehicle 100. For example, the computer 110 may be programmed to transmit a request message including the vehicle 100 information, e.g., license plate number, and the identified part information, e.g., a part number, to a remote computer, e.g., a parts supply location. Once a part is delivered to the vehicle 100, the computer 110 may be programmed to determine that the part to replace is received based on, e.g., data such as a scanned bar code number of the delivered part via a vehicle 100 camera sensor 130.

Upon delivery of the part to replace in the vehicle 100, the computer 110 may be programmed to identify a third destination such as a service center based at least in part on the vehicle 100 part. The computer 110 can then navigate the vehicle 100 to the third destination, e.g., the location of the service center.

In one example, the computer 110 may be programmed to generate the second route based on a current time and expected vehicle 100 deployment time for a user (occupant) transportation. For example, the computer 110 may be programmed to determine an expected vehicle 100 deployment time on a first route based on historical data such as times and locations at which the vehicle 100 was used in last 30 days, e.g., a user typically requests a transportation using the vehicle 100 from a home address to the first destination (e.g., a place of work) on each workday of a week. In one example, if the computer 110 determines that navigating the vehicle 100 to the second destination may prevent the vehicle 100 from an expected deployment, then the computer 110 may be programmed to plan the vehicle 100 navigation to the second destination after the expected deployment.

Sometimes the vehicle 100 may lack a possibility of transporting the part to replace from the second destination to, e.g., a third destination location such as a service center at which the part can be replaced. For example, the vehicle 100 may lack space for transporting the identified part to replace and/or the part may make the vehicle 100 trunk dirty. The computer 110 may be programmed to instruct a second vehicle to transport the vehicle 100 part to a service center from the second destination, upon determining that dimensions of the vehicle 100 part to replace exceeds a predetermined threshold associated with the vehicle 100, and navigate the vehicle 100 to the service center. For example, the computer 110 may be programmed to transmit a message to a remote computer. The message may include the location coordinates of the service center and an identifier, e.g., a part number, of the part to replace. Thus, in this example, the vehicle 100 does not need to navigate to the second destination, e.g., the part supply location, and can navigate to the third destination where the maintenance, e.g., installing the part, will be performed.

Processing

Figure 2:
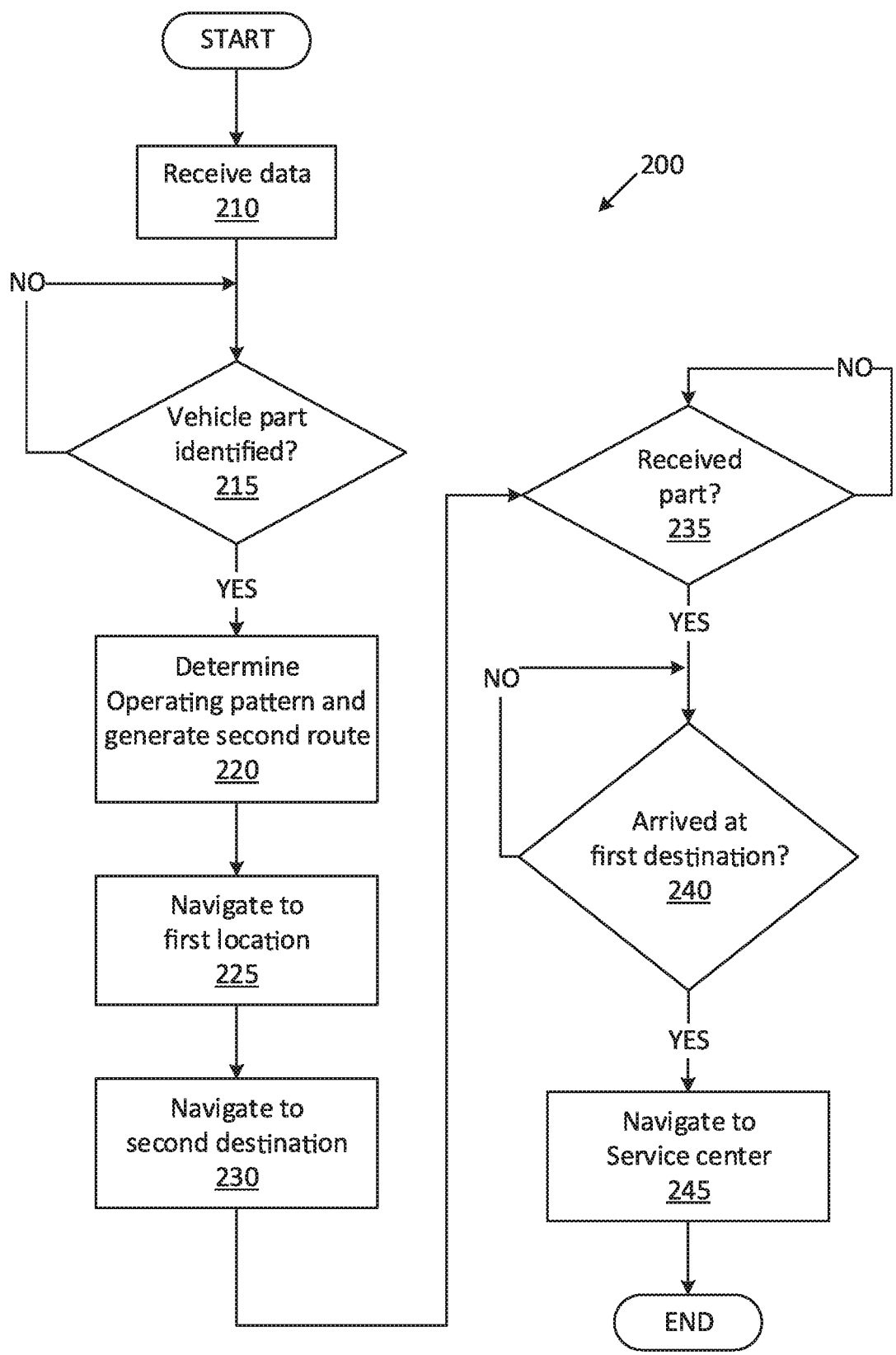
FIG. 2 is a flowchart of an exemplary process for operating a vehicle.

FIG. 2 is a flowchart of an exemplary process 200 for operating a vehicle 100. For example, the vehicle 100 computer 110 may be programmed to execute blocks of the process 200.

The process 200 starts in a block 210, in which the computer 110 receives vehicle 100 data such as a first destination, a diagnostic status, and/or a current location. For example, the computer 110 may be programmed to receive the current location of the vehicle 100 from a vehicle 100 GPS sensor 130, the diagnostic status from a computer 110 memory, and the first destination from the vehicle 100 HMI 140.

Next, in a decision block 215, the computer 110 determines whether a vehicle 100 part is identified to be replaced. For example, the computer 110 may be programmed to identify a vehicle 100 part based on the diagnostic status, the first destination, and/or the current location of the vehicle 100. The computer 110 may be programmed to identify the vehicle 100 part based on a severity of a detected and/or predicted fault condition, e.g., based on the levels of severity. The computer 110 may be programmed to identify the vehicle 100 part based on determining whether a distance away from the current location and/or first route to a second destination exceeds a predetermined distance threshold. Additionally or alternatively, the computer 110 may be programmed to identify the vehicle 100 part based on determining whether a confidence level determined based on the fault condition(s), first route, vehicle 100 location, etc., exceeds a predetermined confidence threshold, e.g., 80%. If the computer 110 determines that a vehicle 100 part to replace is identified, then the process 200 proceeds to a block 220; otherwise the process 200 returns to the decision block 215.

In the block 220, the computer 110 determines the second route including the second destination, and the operating pattern of the vehicle 100. For example, the vehicle 100 may be programmed to determine the second destination based on an availability of the identified vehicle 100 part at the second destination. The computer 110 may be programmed to determine the operating pattern based on the diagnostic status, e.g., an active fault condition, a remaining useful life of the vehicle 100 part, etc., e.g., as discussed above with reference to Table 2. For example, the computer 110 may be programmed to generate the second route based on the determined operating pattern, e.g., as shown in the first example of Table 2, finding a second route maximizing travel on a freeway or highway (to reduce brake pad usage). The computer 110 may be programmed to generate the second route based on the expected time of arrival, e.g., by determining whether navigating to a nearest second destination, e.g., a part supply location, will make the expected time of arrival later. Additionally or alternatively, the computer 110 may be programmed to identify the second destination and generate the second route based on the severity of the determined or predicted fault condition.

Next, in a block 225, the computer 110 navigates the vehicle 100 to the first destination, by controlling vehicle 100 operation including propulsion, braking, and/or steering. Thus, advantageously, a vehicle 100 occupant may arrive the first destination without extending travel time to the second destination prior to arriving at the first destination.

Next, in a block 230, the computer 110 navigates the vehicle 100 to the determined second destination, e.g., by actuating vehicle 100 propulsion, braking, and/or steering. For example, the computer 110 navigates the vehicle 100 to the second destination based on data received from the vehicle 100 GPS sensor 130, the map data, etc. Additionally or alternatively, the computer 110 may navigate first to the second destination and then to the first destination.

Next, in a decision block 235, the computer 110 determines whether the identified part to replace was received in the vehicle 100. For example, the computer 110 may be programmed to determine that the part to replace is received based on, e.g., data such as a scanned bar code number of the delivered part via a vehicle 100 camera sensor 130. Although not shown in FIG. 2, as discussed above, upon determining that dimensions of the vehicle 100 part to replace exceeds a predetermined threshold associated with the vehicle 100, the computer 110 may navigate the vehicle 100 to a service center instead of receiving the part, e.g., in a vehicle 100 trunk, to be installed later at the service center. If the computer 110 determines that the part to replace was received, then the process 200 proceeds to a decision block 240; otherwise the process 200 returns to the decision block 235.

Next, in a decision block 240, the computer 110 determines whether the vehicle 100 has arrived at the first destination. If the computer 110 determines that the vehicle 100 has arrived at the first destination, then the process 200 proceeds to a block 245; otherwise the process 200 returns to the decision block 240.

In the block 245, the computer 110 navigates the vehicle 100 to the service center by controlling vehicle 100 operation including propulsion, braking, and/or steering. Although not shown in FIG. 1, the computer 110 may determine to navigate the vehicle 100 to the service center prior to navigating the vehicle 100 to the first destination, e.g., based on the location coordinates of the service center, the first destination, the diagnostic status, etc.

Following the block 245, the process 200 ends, or alternatively returns to the block 210, although not shown in FIG. 2.

Unless indicated explicitly to the contrary, "based on" means "based at least in part on" and/or "based entirely on."

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   identify a vehicle part to replace upon determining based on received vehicle data including a diagnostic status, a location, and a first route that a fault condition severity level of the identified vehicle part exceeds a severity level threshold and a vehicle distance to a second destination is less than a distance threshold, wherein the distance threshold is determined based on the fault condition severity level;
   determine a vehicle operating pattern based on the identified vehicle part;
   generate a second route including the second destination based on the vehicle part, the vehicle operating pattern, the location, and a first destination and an expected time of arrival of the first route; and
   navigate the vehicle based on the second route and the vehicle operating pattern.

2. The system of claim 1, wherein the diagnostic status further includes a remaining useful life for the vehicle part, estimated based on vehicle sensor data and vehicle historical data, and a diagnostic trouble code, and the instructions include further instructions to identify the vehicle part to replace upon determining based on at least one of the estimated remaining useful life for the vehicle part is less than a specified threshold and the diagnostic trouble code associated with the vehicle part is recorded.

3. The system of claim 2, wherein the instructions include further instructions to identify the vehicle part to replace upon determining based on the first route that a planned travel distance exceeds the remaining useful life for the vehicle part.

4. The system of claim 1, wherein the instructions include further instructions to navigate the vehicle based on the determined vehicle operating pattern by limiting at least one of a vehicle speed, a vehicle acceleration, a vehicle deceleration, and a vehicle yaw rate to a respective threshold.

5. The system of claim 1, wherein the instructions include further instructions to determine the second route based at least in part on map data including a road curvature and a road speed limit, the vehicle operating pattern including at least one of a vehicle maximum speed, a vehicle maximum acceleration, and a vehicle maximum yaw rate.

6. The system of claim 1, wherein the instructions include further instructions to generate the second route based on a current time and expected vehicle deployment time for vehicle occupant transportation.

7. The system of claim 1, wherein the instructions include further instructions to instruct a second vehicle to transport the vehicle part to a service center at the second destination, upon determining that dimensions of the vehicle part to replace exceeds a predetermined threshold associated with the vehicle, and navigate the vehicle to the service center.

8. A method, comprising:
   identifying a vehicle part to replace upon determining based on received vehicle data including a diagnostic status, a location, and a first route that a fault condition severity level of the identified vehicle part exceeds a severity level threshold and a vehicle distance to a second destination is less than a distance threshold, wherein the distance threshold is determined based on the fault condition severity level;
   determining a vehicle operating pattern based on the identified vehicle part;
   generating a second route including the second destination based on the vehicle part, the vehicle operating pattern, the location, and a first destination and an expected time of arrival of the first route; and
   navigating the vehicle based on the second route and the vehicle operating pattern.

9. The method of claim 8, further comprising identifying the vehicle part to replace upon determining based on at least one of an estimated remaining useful life for the vehicle part is less than a specified threshold and a diagnostics trouble code associated with the vehicle part is recorded, wherein the diagnostic status further includes the estimated remaining useful life for the vehicle part and the diagnostic trouble code.

10. The method of claim 9, further comprising identifying the vehicle part to replace upon determining based on the first route that a planned travel distance exceeds the remaining useful life for the vehicle part.

11. The method of claim 8, further comprising navigating the vehicle based on the determined vehicle operating pattern by limiting at least one of a vehicle speed, a vehicle acceleration, a vehicle deceleration, and a vehicle yaw rate to a respective threshold.

12. The method of claim 8, further comprising determining the second route based at least in part on map data including a road curvature and a road speed limit, the vehicle operating pattern including at least one of a vehicle maximum speed, a vehicle maximum acceleration, and a vehicle maximum yaw rate.

13. The method of claim 8, further comprising generating the second route based on a current time and expected vehicle deployment time for vehicle occupant transportation.

14. The method of claim 8, further comprising instructing a second vehicle to transport the vehicle part to a service center at the second destination, upon determining that dimensions of the vehicle part to replace exceeds a predetermined threshold associated with the vehicle, and navigating the vehicle to the service center.

* * * * *